United States Patent
Banas

(10) Patent No.: US 6,396,412 B1
(45) Date of Patent: May 28, 2002

(54) PASSIVE RF-RF ENTRY SYSTEM FOR VEHICLES

(75) Inventor: Patrick A. Banas, Sterling Heights, MI (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/932,816

(22) Filed: Aug. 17, 2001

Related U.S. Application Data
(60) Provisional application No. 60/227,412, filed on Aug. 23, 2000.

(51) Int. Cl.$^7$ ............................................. B60R 25/10
(52) U.S. Cl. ......................... 340/825.31; 340/825.72; 340/825.34; 340/539; 340/825.69; 340/825.49; 340/5.61; 340/5.23; 340/5.72; 340/5.64; 340/825.22
(58) Field of Search ........................... 340/426, 825.31, 340/825.72, 825.34, 539, 825.69, 825.49, 5.61, 5.23, 5.72, 5.64, 825.22

(56) References Cited

U.S. PATENT DOCUMENTS

| | | | | |
|---|---|---|---|---|
| 5,319,364 A | * | 6/1994 | Waraksa et al. ....... | 340/825.72 |
| 5,379,033 A | * | 1/1995 | Fujii et al. ............. | 340/825.69 |
| 5,517,189 A | * | 5/1996 | Bachhuber et al. .... | 340/825.69 |
| 5,710,548 A | * | 1/1998 | LeMense ............... | 340/825.69 |
| 5,751,073 A | * | 5/1998 | Ross ....................... | 307/10.5 |
| 6,034,617 A | * | 3/2000 | Luebke et al. ......... | 340/825.31 |

* cited by examiner

Primary Examiner—Daniel J. Wu
Assistant Examiner—Tai T. Nguyen

(57) ABSTRACT

A system for preventing unauthorized access to a vehicle having a passive entry system uses a bi-directional radio frequency, or RF-RF, signal. When using a RF-RF signal system, the signal from vehicle to a driver's ID device is non-directional and not significantly distance limited. Consequently, a thief may be able to activate the entry system and gain access to the vehicle when the driver's ID device is simply within range. The inventive passive entry system interrogates the ID device periodically following parking and locking of the vehicle. The signal strength levels received by the vehicle from the ID device are stored and a signal strength threshold level is computed. Upon a request for entry to the vehicle, a current signal strength level is compared to the signal strength threshold level. Based on that comparison, it is determined whether the request is valid or unauthorized. If the request for entry is deemed unauthorized, then access to the vehicle is not granted.

14 Claims, 4 Drawing Sheets

PASSIVE RF-RF ENTRY SYSTEM FOR VEHICLES

BACKGROUND OF THE INVENTION

This application claims priority to United States Provisional Patent Application 60/227,412, filed Aug. 23, 2000.

This invention relates to a system for preventing unauthorized operation of a vehicle having a passive entry/start system, and in particular one that uses a bi-directional radio frequency, or RF-RF, signal.

Modern vehicles are becoming equipped with passive entry/start systems whereby an authorized vehicle operator carries an electronic key or card that contains electronic identifying information. The entry system of the vehicle responds accordingly when the presence of the electronic identifying information, or ID device, is detected. Essentially, these passive systems do not require actuation of any lock, nor the use of any key. Instead, when the operator attempts to pull the door handle open, the vehicle interrogates the area around the vehicle to determine whether a valid ID device is detected. If so, then the door is opened, the ignition started, etc.

Typically, these passive entry/start systems employ a low frequency-radio frequency or LF-RF signal system. That is, the transmission sent from the vehicle to the ID device uses a low frequency (LF) signal and the transmission from the ID device to the vehicle is sent using a radio frequency (RF) signal. The LF signal is directional, and a distance limited signal.

While the LF-RF signal systems perform well, they are expensive in comparison with RF-RF signal systems considered for use in passive entry/start systems. A RF-RF signal system can be less expensive because there are fewer antennas required than the LF-RF signal system. The LF-RF signal system usually needs antennas at each entry point, such as doors and the trunk, and also in the interior for starting. Further, the RF-RF signal system uses a less expensive type of antenna.

The use of a RF-RF signal system in passive entry/start systems, however, presents a challenge in that the signal from the vehicle to the ID device is neither directional, nor significantly distance limited. This can create problems in which a thief can activate the system (by pulling on the door handle, closing a switch, mechanical or capacitive sensing, etc.) and gain unauthorized access to the vehicle when the ID device is left within range (eg: ID device in house and vehicle parked close to house) or when the ID device is left within the vehicle. If the ID device is within range, the thief could enter the car, start the car, and drive away. It would therefore be desirable to provide a passive entry/start system for use in vehicles with a less cost prohibitive bi-directional radio frequency signal that also would not be subject to unauthorized vehicle access and operation.

SUMMARY OF THE INVENTION

In a disclosed embodiment of this invention, a method is devised to prevent unauthorized access to a vehicle equipped with a bi-directional, signal passive entry/start system. The method comprises a system to measure the signal strength level received by the vehicle's passive entry receiver from the driver's ID device and compare the strength to a prior received signal.

At a time after the vehicle is turned off and locked, the signal strength level is measured. This signal strength is used as a threshold value. The signal strength level is stored, and may then be measured periodically. When a request occurs for a change in vehicle status, the vehicle's passive entry control unit compares a new measured signal strength level to the threshold to make a prediction on whether a current request is authorized.

These and other features of the present invention can be understood from the following specification and drawings, the following of which is a brief description.

DETAILED DESCRIPTION OF THE DRAWINGS

Figure 1:
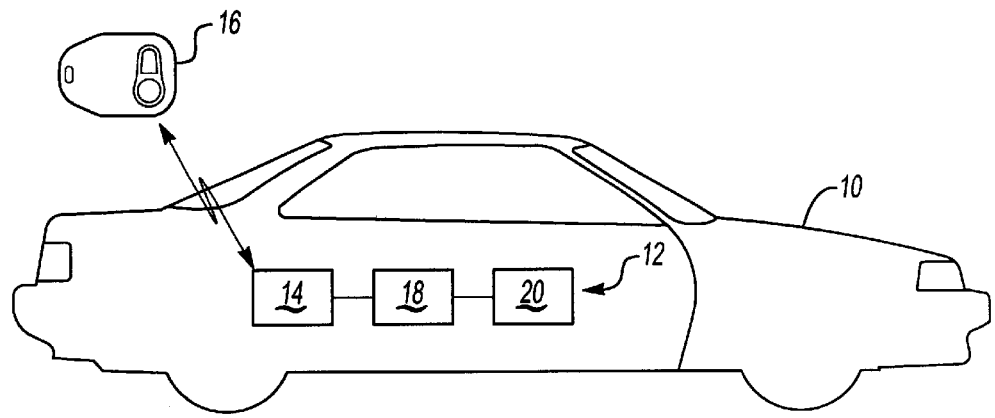
FIG. 1 is a schematic view of the passive entry system of the present invention.

FIG. 1 schematically shows vehicle 10 incorporating the inventive passive entry system shown generally at 12. Passive entry system uses a bi-directional radio frequency or RF-RF signal and incorporates a method to measure the signal strength level received by the vehicle's passive entry receiver 14 from the driver's ID device 16. This is accomplished by using a Received Signal Strength Indicator, or RSSI, as an indicator of the closeness of the ID device. The vehicle's receiver 14 requests a response from any valid nearby ID devices 16 at an appropriate time. Preferably, the request occurs shortly after the vehicle 10 is turned off and locked. The signal strength level of the ID device's initial response ($RSSI_1$) is stored in the passive entry control unit 18. Later, a second signal strength level ($RSSI_2$) of the ID device's response to a second request from the vehicle's passive entry system 12 may be measured again. This procedure may be repeated periodically.

If no response (or a series of no responses) is received, then the vehicle's passive entry system 12 can assume that the ID device 16 has left the immediate area and it can stop interrogating in order to save the battery charge while the vehicle is parked and not running. Later, the vehicle's passive entry control unit 18 compares the signal strength level of a latest response ($RSSI_x$) when a request for a change in status is received, to a threshold value. The threshold value may be a signal strength threshold level which may be the initial response ($RSSI_1$), or the last response ($RSSIX_{x-1}$), or a computed signal strength level based on earlier responses ($f\{RSSI_{x-1}, RSSI_{x-2}, \ldots\}$).

However determined, the computed signal strength threshold level ($RSSI_{threshold}$) may be incorporated with a high-offset constant ($C_{high\text{-}offset}$) or a low-offset constant ($C_{low\text{-}offset}$) in order to account for a margin of error. The computed signal strength threshold level ($RSSI_{threshold}$) could also use temperature as a variable to account for changes in signal strength received over time as temperature changes.

In any case, the difference between the signal strength level of the last response received ($RSSI_x$) and the threshold signal strength level ($RSSI_{threshold}$) incorporating the constant (C) is what will be used to determine whether to grant vehicle entry when the valid ID device 16 is within the range of the vehicle 10 when a request for a chance in status is received.

The method for determining whether to grant vehicle entry is accomplished in four cases as shown in FIGS. 2 through 5.

Figure 2:
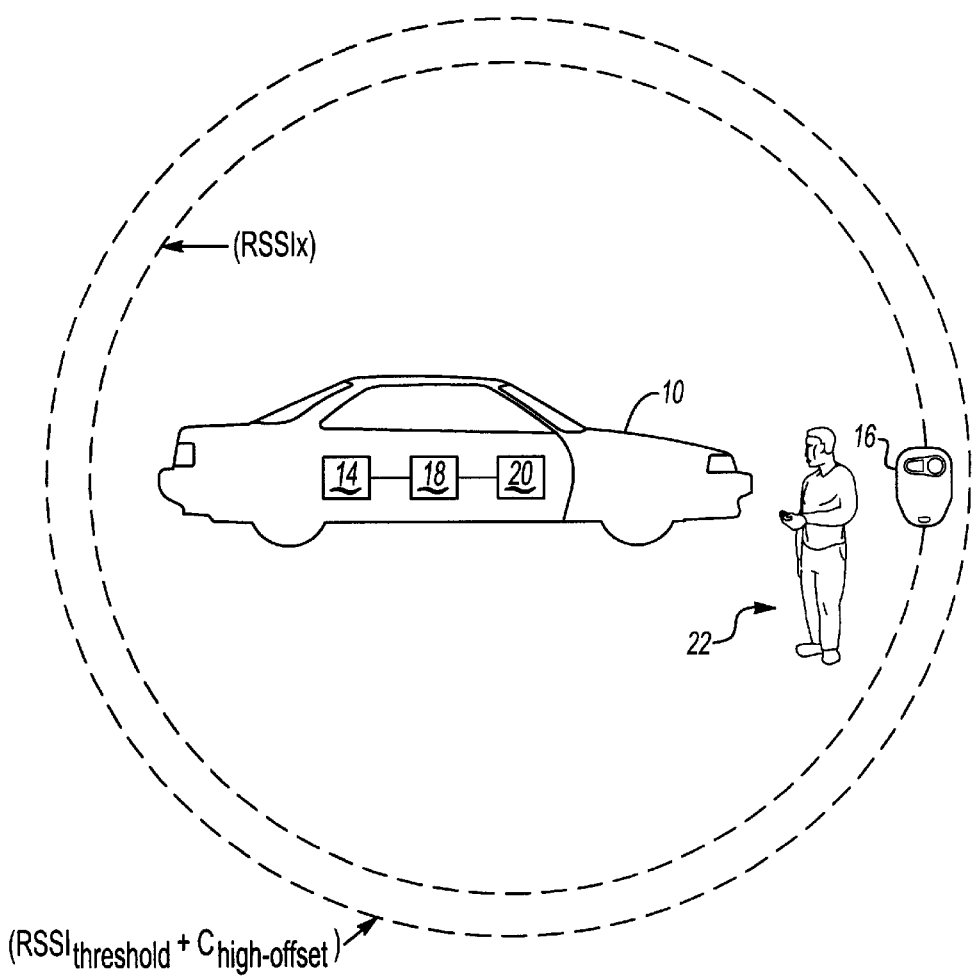
FIG. 2 is a schematic diagram of a first case where vehicle entry is requested.

With respect to FIG. 2, if entry is requested by driver 22 (i.e., the door handle is opened) and ($RSSI_x$) is greater than ($RSSI_{threshold}+C_{high-offset}$), then it is determined by the passive entry control unit 18 that the driver ID device 16 has come closer to the vehicle 10 and a signal is sent to a vehicle lock control 20 to unlock the vehicle. That is, the driver 22 with device 16 is very close to the vehicle and it can be assumed the request is authorized.

Figure 3:
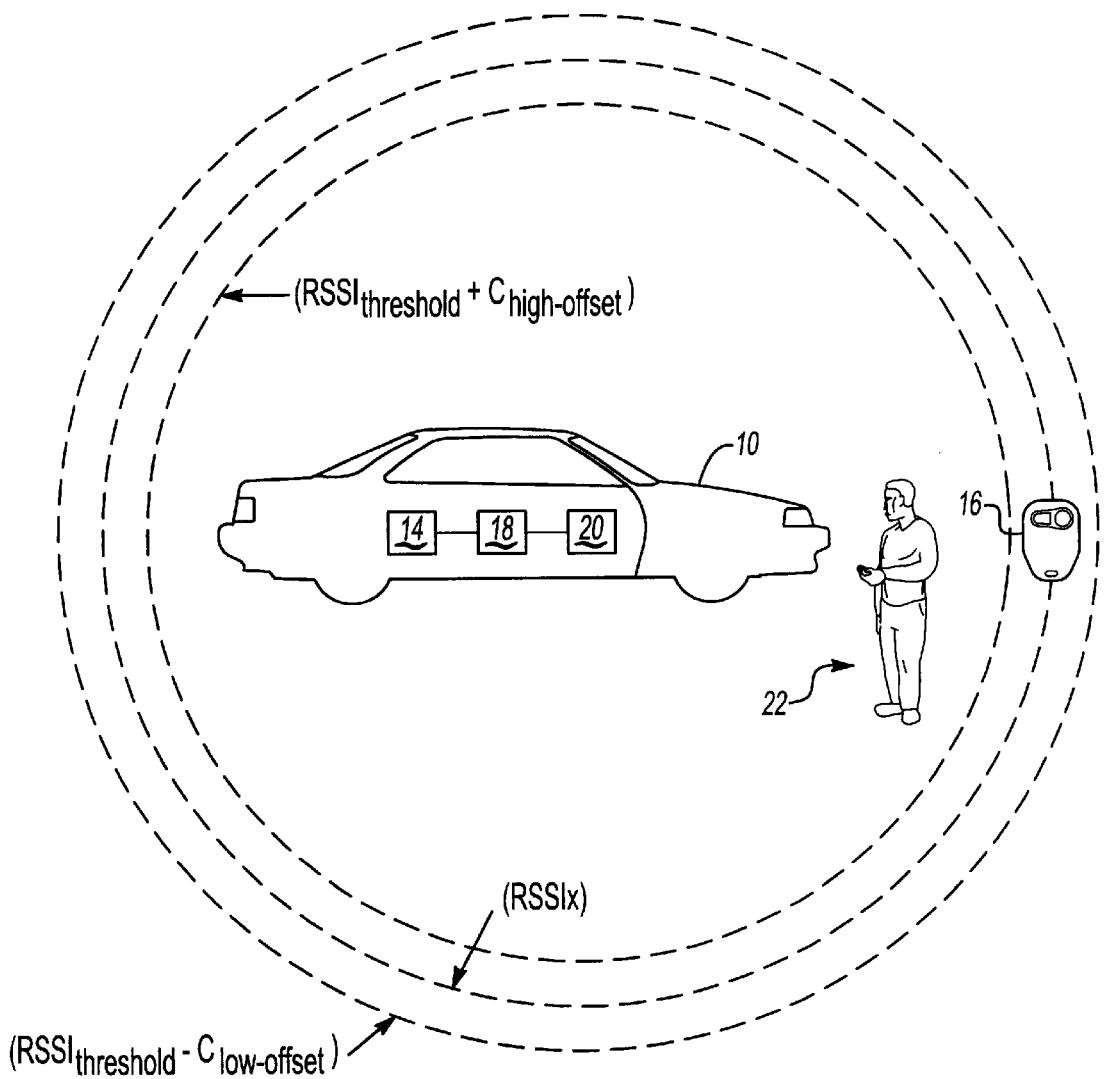
FIG. 3 is a schematic diagram of a second case where vehicle entry is requested.

With respect to FIG. 3, if entry is requested by driver 22 and ($RSSI_x$) is less than ($RSSI_{threshold}+C_{high-offset}$) and also greater than ($RSSI_{threshold}-C_{low-offset}$), then it is determined by passive entry control unit 18 that the driver's ID device 16 is the same distance from the vehicle 10. It is assumed that unauthorized entry has been requested and no signal is sent to the vehicle lock control 20.

Figure 4:
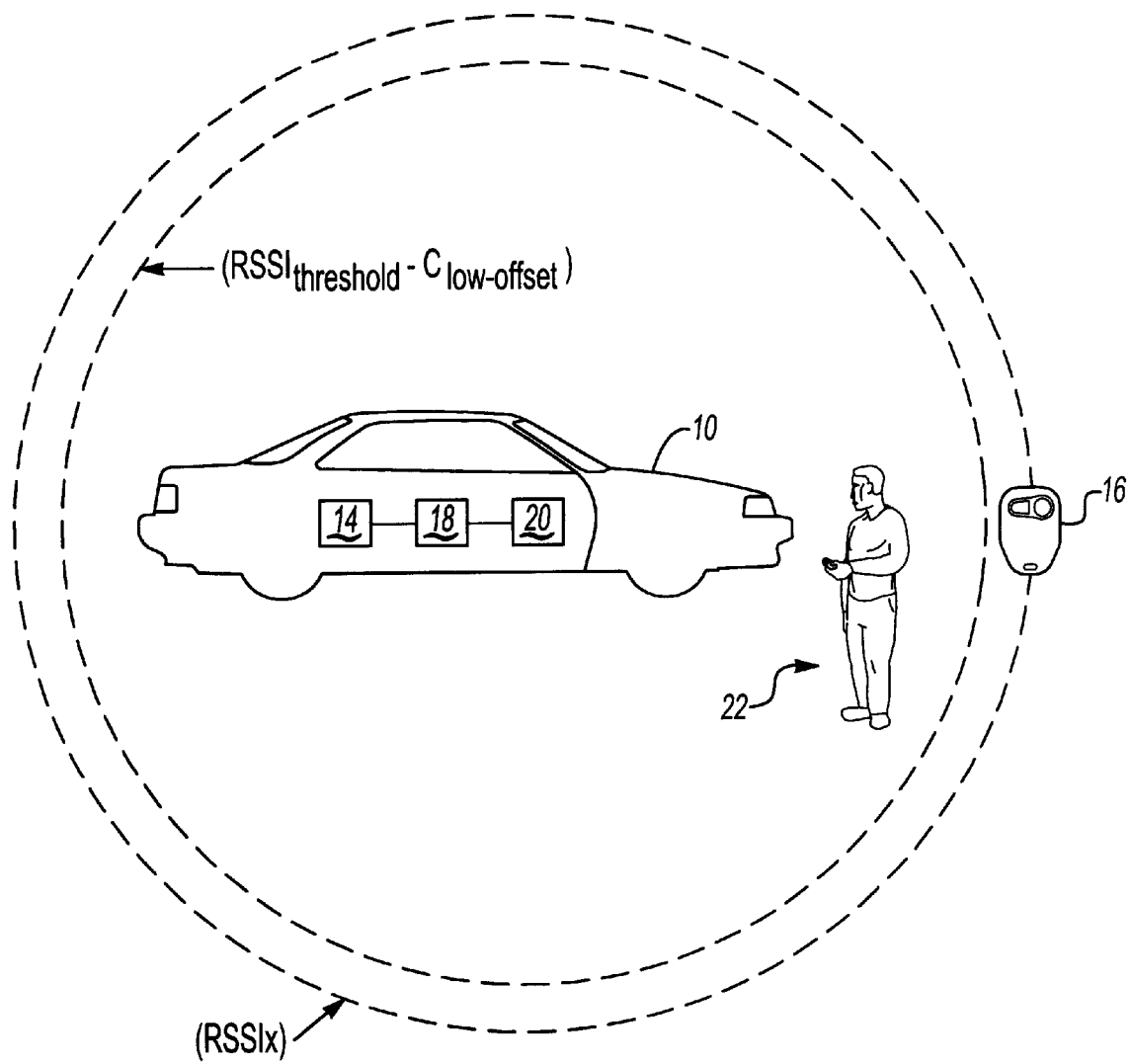
FIG. 4 is a schematic diagram of a third case where vehicle entry is requested.

With respect to FIG. 4, if entry is requested by driver 22 and ($RSSI_x$) is less than ($RSSI_{threshold}-C_{low-offset}$), then it is determined by passive entry control unit 18 that the driver's ID device 16 is moving away from the vehicle 10. It is assumed that unauthorized entry has been requested and no signal is sent to the vehicle lock control 20.

Figure 5:
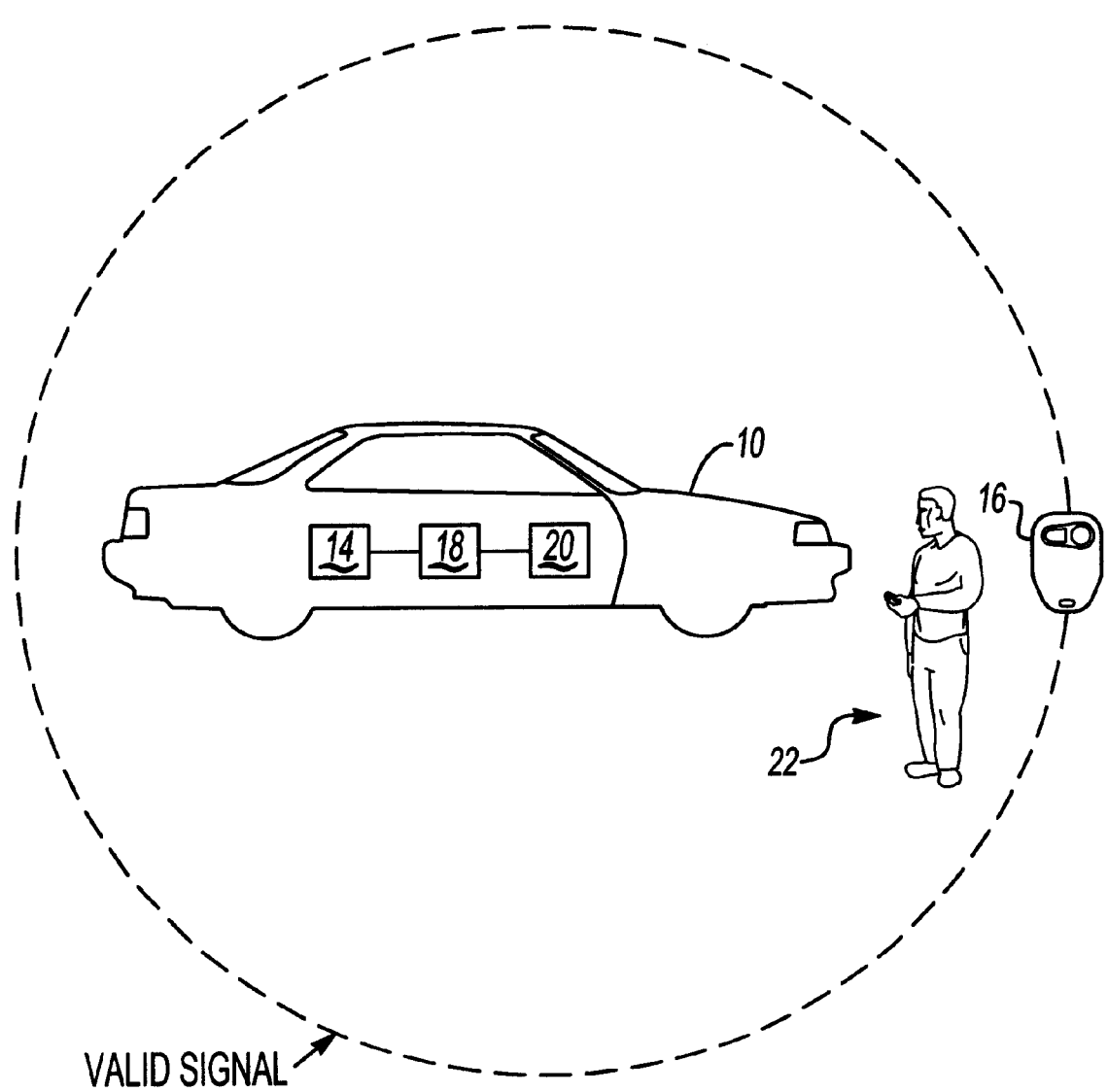
FIG. 5 is a schematic diagram of a fourth case where vehicle entry is requested.

With respect to FIG. 5, if entry is requested and a valid signal is received by passive entry control unit 18 which had previously determined that ID device had left the area, then it is assumed that vehicle entry is to be granted and a signal is sent to vehicle lock control 20 to unlock the vehicle for the identified driver.

A preferred embodiment of this invention has been disclosed, however, a worker in this art would recognize that certain modifications would come within the scope of this invention. For that reason, the following claims should be studied to determine the true scope and content of this invention.

What is claimed is:

1. A passive entry system for a vehicle that uses a bi-directional signal between the vehicle and a passive driver's ID device comprising:

a transmitter and receiver on a vehicle, and a transmitter and receiver in a passive driver's ID device;

said vehicle being provided with a vehicle lock and a control for said vehicle lock, said vehicle transmitter and receiver taking a reference level signal strength of said passive driver's ID device at said vehicle transmitter and receiver and storing a threshold value based on said level signal strength, and when a request occurs for access to said vehicle lock, said vehicle transmitter and receiver taking a current signal strength of a passive driver's ID device, and comparing said current to said threshold values to determine whether the request is authorized.

2. A passive entry system as recited in claim 1, wherein said passive entry receiver within said vehicle periodically receives measured signal strength levels from the ID device after the vehicle is parked and locked.

3. A passive entry system as recited in claim 2, wherein a passive entry control unit stores the measured signal strength levels and computes a threshold signal strength level based on plural measured signal strength levels.

4. A passive entry system as recited in claim 3, wherein at a point in time when vehicle entry is requested, compares the most recent measured signal strength level to said computed threshold signal strength level to determine whether the request for entry is authorized, and a vehicle lock control which unlocks the vehicle in response to a signal from said passive entry control unit at a point when it has been determined that the request for entry is unauthorized.

5. A passive entry system as recited in claim 1, wherein at the point in time when vehicle entry is requested, if the result of said compared signal strength levels determine that vehicle entry is authorized, then a signal is sent to said vehicle lock control to unlock said vehicle, and if the result of said compared signal strength levels determine that vehicle entry is not authorized, then no signal is sent to said vehicle lock control and said vehicle remains locked.

6. A passive entry system as recited in claim 1, wherein a comparison is factored into said threshold signal strength level to assist in determining whether a request is authorized.

7. A passive entry system as recited in claim 1, wherein said comparison provides an indication of whether a current signal strength indicates the passive driver's ID device is closer than at the time of the threshold level, approximately the same distance away, or further away from the vehicle, and this determination is utilized to determine whether a request is authorized.

8. A passive entry system for a vehicle comprising:

a bidirectional radio frequency signal transmitter and receiver on a vehicle and in a passive ID device, said vehicle incorporating a system for preventing unauthorized entry to said vehicle;

said transmitter and receiver within said vehicle periodically receiving measured signal strength levels from the ID device after said vehicle is parked and locked;

a control unit storing the signal strength levels and computes a threshold signal strength level based on said measured signal strength levels;

a device on said vehicle to request entry, said control requesting a current signal level when an entry request is received; and said current signal level is compared to said computed threshold signal strength level to determine whether the request for entry is authorized, and a vehicle lock control unlocks a vehicle lock in response to a signal from said passive entry control unit at a point when it has been determined that the request for entry is authorized.

9. A passive entry system as recited in claim 8, wherein if the result of said compared signal strength levels determines that vehicle entry is unauthorized, then a signal is not sent to said vehicle lock control to unlock said vehicle.

10. A passive entry system as recited in claim 8, wherein a comparison is factored into said threshold signal strength level to assist in determining whether a request is authorized.

11. A passive entry system as recited in claim 8, wherein said comparison provides an indication of whether a current signal strength indicates the passive driver's ID device is closer than at the time of the threshold level, approximately the same distance away, or further away from the vehicle, and this determination is utilized to determine whether a request is authorized.

12. A method for preventing unauthorized access to a vehicle having a passive entry system comprising the steps of:

periodically measuring a signal strength level received by a passive entry receiver in the vehicle from a driver's ID device after the vehicle is parked and locked;

storing the measured signal strength levels;

computing a threshold signal strength level based on said stored signal strengths; and at a point in time when vehicle entry is requested, comparing the most recent measured strength level to said computed threshold signal strength level to determine whether the requested entry is authorized and then controlling vehicle entry accordingly.

13. A method for preventing unauthorized access to a vehicle as recited in claim 12 wherein at the point in time when vehicle entry is requested, if the result of said compared signal strength levels determine that vehicle entry is authorized, then a signal is sent to a vehicle lock control to unlock said vehicle.

14. A method for preventing unauthorized access to a vehicle as recited in claim 12, wherein at the point in time when vehicle entry is requested, if the result of said compared signal strength levels determine that vehicle entry is not authorized, then no signal is sent to a vehicle lock control and said vehicle remains locked.

* * * * *